(12) United States Patent
Wang et al.

(10) Patent No.: US 12,204,199 B1
(45) Date of Patent: Jan. 21, 2025

(54) SWITCHABLE POLARIZATION COMPONENT

(71) Applicant: Meta Platforms Technologies, LLC, Menlo Park, CA (US)

(72) Inventors: Yu-Jen Wang, San Jose, CA (US); Xinyu Zhu, San Jose, CA (US); Chulwoo Oh, Sammamish, WA (US); Sawyer Miller, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/141,941

(22) Filed: May 1, 2023

Related U.S. Application Data

(60) Provisional application No. 63/445,289, filed on Feb. 13, 2023.

(51) Int. Cl.
*G02F 1/1335* (2006.01)
*G02B 27/28* (2006.01)

(52) U.S. Cl.
CPC ..... *G02F 1/133528* (2013.01); *G02B 27/286* (2013.01); *G02B 2207/123* (2013.01); *G02F 2203/07* (2013.01)

(58) Field of Classification Search
CPC ........... G02F 1/133528; G02F 2203/07; G02B 27/286; G02B 2207/123; G02B 27/0101; G02B 27/017; G02B 2027/0118; G02B 2027/012; G02B 2027/0121; G02B 2027/015; G02B 27/283; G02B 2027/0112; B60R 2300/205; G03B 21/604
See application file for complete search history.

(56) References Cited

U.S. PATENT DOCUMENTS

| | | | |
|---|---|---|---|
| 11,002,970 B2 | 5/2021 | Martinez et al. | |
| 11,009,737 B1* | 5/2021 | Matsuda | G02F 1/133504 |
| 11,237,413 B1 | 2/2022 | Weber et al. | |
| 2018/0356639 A1* | 12/2018 | Schaefer | G02F 1/1326 |
| 2020/0018962 A1 | 1/2020 | Lu et al. | |
| 2020/0341268 A1* | 10/2020 | Amirsolaimani | G02B 27/286 |
| 2021/0247632 A1* | 8/2021 | Robbins | G02F 1/291 |
| 2021/0364987 A1* | 11/2021 | Li | G03H 1/0404 |

FOREIGN PATENT DOCUMENTS

WO 2022179312 A1 9/2022

OTHER PUBLICATIONS

Peng F., et al., "Liquid Crystals for Virtual Reality (VR)," Society for Information Display, Jun. 28, 2021, vol. 52, No. 1, pp. 427-430.

* cited by examiner

*Primary Examiner* — Mariam Qureshi
(74) *Attorney, Agent, or Firm* — Greenberg Traurig, LLP

(57) ABSTRACT

An optical subassembly for switchably focusing or redirecting a light beam may include a polarization element having a polarization-selective beam redirection/focusing property, a first switchable polarization rotator upstream of the polarization element, and a second switchable polarization rotator downstream of the polarization element. A polarizer may be provided immediately downstream of the second switchable polarization rotator. The first and second switchable polarization rotators may be operated in counterphase, so as to mutually offset dependence of angle and wavelength characteristics of the polarization rotators on the switching state of the polarization rotators.

20 Claims, 10 Drawing Sheets

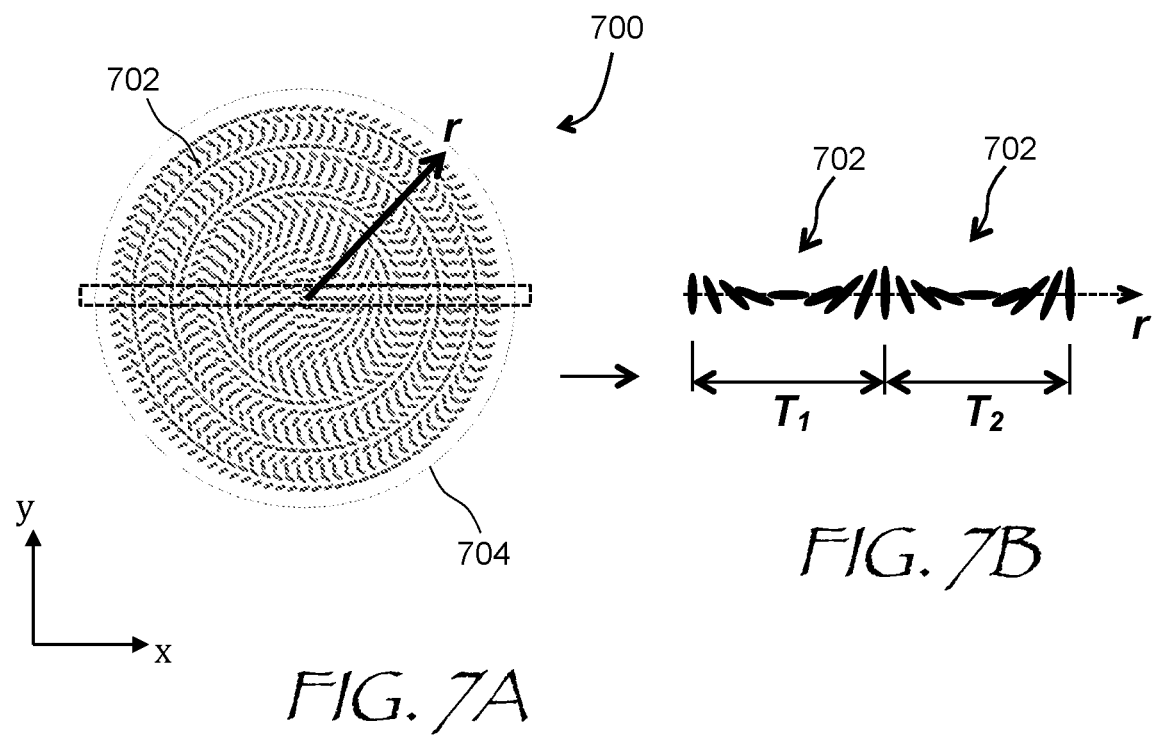
FIG. 7A
FIG. 7B
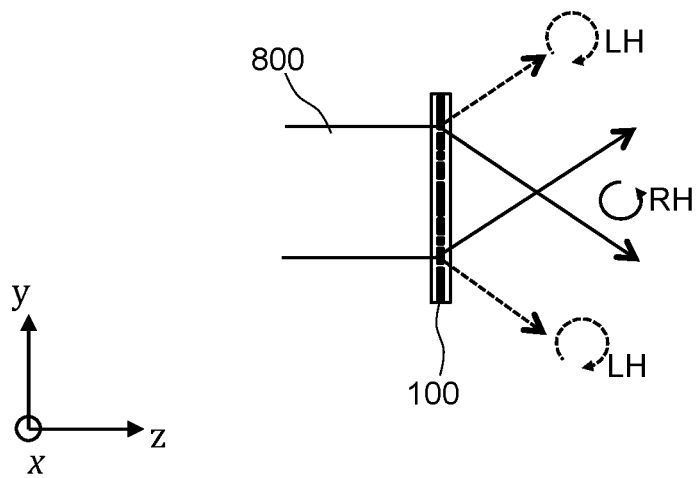
FIG. 8

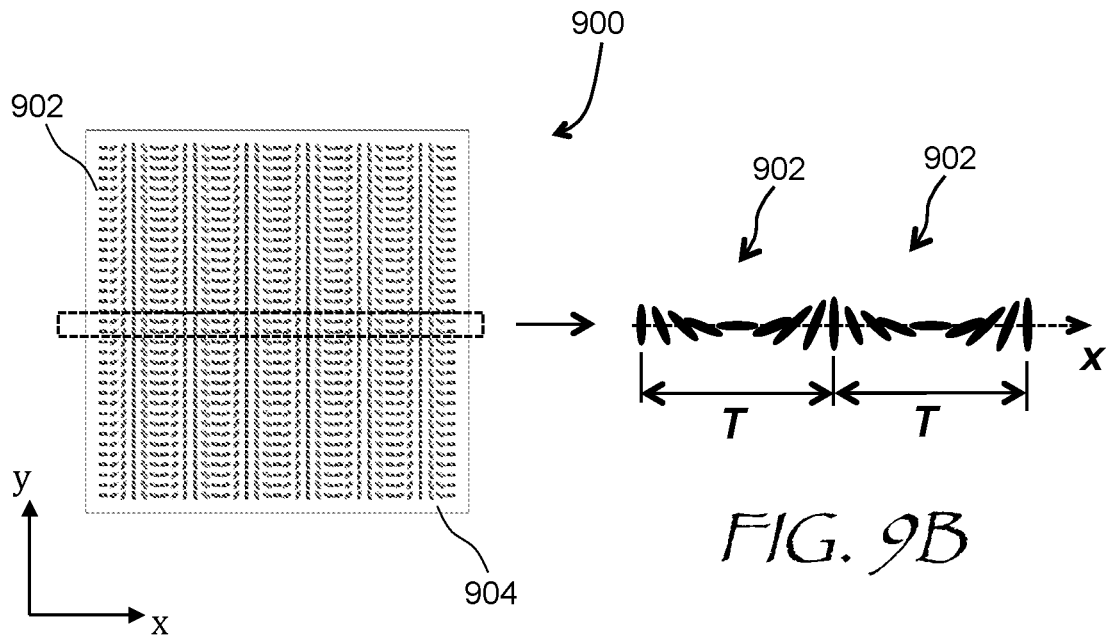
FIG. 9A
FIG. 9B
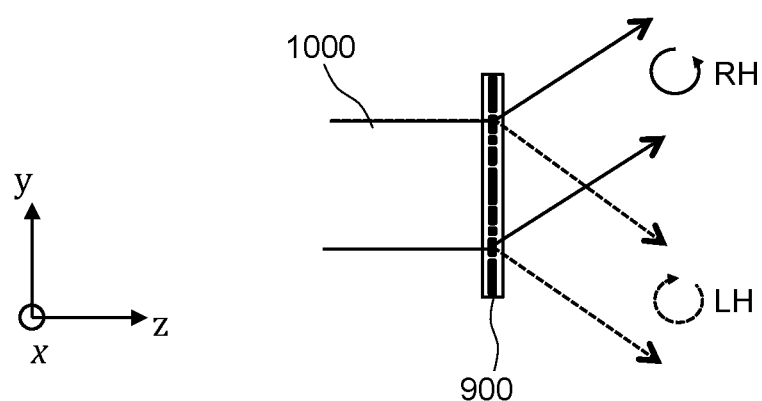
FIG. 10

SWITCHABLE POLARIZATION COMPONENT

REFERENCE TO RELATED APPLICATION

This application claims priority from U.S. Provisional Patent Application No. 63/445,289 entitled "SWITCHABLE POLARIZATION COMPONENT", filed on Feb. 13, 2023 and incorporated herein by reference in their entirety.

TECHNICAL FIELD

The present disclosure relates to polarization optical devices, and in particular to polarization-based optical switches usable in visual display systems.

BACKGROUND

Visual displays provide information to viewer(s) including still images, video, data, etc. Visual displays have applications in diverse fields including entertainment, education, engineering, science, training, advertising, to name just a few examples. Some visual displays, such as TV sets, display images to several users, while some visual display systems, such as near-eye displays (NEDs), are intended for use by individual viewers. NEDs wearable on the user's head may be self-contained, or may be connected to a controller or a console providing the video feed and/or required control functions.

An artificial reality system may include an NED (e.g., a headset or a pair of glasses) configured to present content to a user. The NED may display virtual objects or combine images of real objects with virtual objects in virtual reality (VR), augmented reality (AR), or mixed reality (MR) applications. For example, in an AR system, a user may view images of virtual objects (e.g., computer-generated images) superimposed with the surrounding environment by seeing through a "combiner" component. The combiner of a wearable display is typically transparent to external light but includes some light routing optic to place the display-generated images into the user's field of view.

Because an HMD is worn on the head of a user, a large, bulky, unbalanced, and/or heavy display device would be cumbersome and uncomfortable for the user to wear. Consequently, head-mounted display devices can benefit from a compact and efficient configuration, including efficient light sources providing illumination of a display panel, high-throughput ocular lenses, reflectors, diffractive optical elements, optical switches, beam redirectors, varifocal lenses, and other compact optical elements in the image-forming train.

BRIEF DESCRIPTION OF THE DRAWINGS

Exemplary embodiments will now be described in conjunction with the drawings, in which:

FIG. 7A is a frontal view of a Pancharatnam-Berry phase (PBP) LC lens as an example polarization element of this disclosure;

FIG. 7B is a magnified schematic view of LC molecules in an LC layer of the PBP LC lens of FIG. 7A;

FIG. 8 is a side schematic view of the PBP LC lens of FIG. 7A illustrating light propagation depending on the polarization of impinging light;

FIG. 9A is a frontal view of a PBP LC grating as an example polarization element of this disclosure;

FIG. 9B is a magnified schematic view of LC molecules in an LC layer of the PBP LC grating of FIG. 9A;

FIG. 10 is a side schematic view of the PBP LC grating of FIG. 9A illustrating light propagation depending on the polarization of impinging light;

DETAILED DESCRIPTION

Figure 1A:
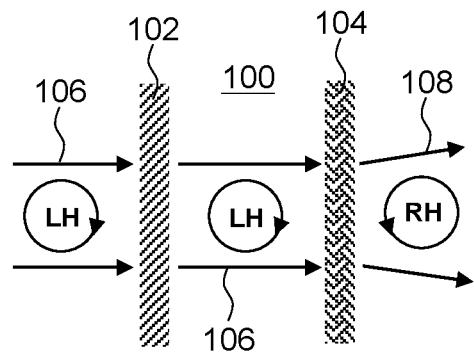
FIG. 1A is a schematic cross-sectional view of a varifocal lens including a switchable polarization rotator coupled to a polarization-selective lens, where the switchable polarization rotator is in a first state that does not change polarization of impinging light.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 4A-4B, FIG. 6, and FIGS. 11-13, similar elements are denoted with similar reference numerals.

Switchable polarization rotators may be used in combination with polarization elements that refocus or redirect, or otherwise modify an impinging light beam depending on the polarization state of the light beam. Many switchable polarization rotators have optical properties, such as throughput dependence on wavelength and angle of incidence, that differ in different switching states. When used in combination with polarization elements, the switchable polarization rotators modify the spectral and angular composition of the propagated light upon switching. In a polarization-selective varifocal lens application where a polarization rotator is coupled to a lens whose focal length depends on polarization of impinging light, this may cause unexpected color shifts or modulations when adjusting focus with the polarization-selective varifocal lens.

In accordance with this disclosure, two switchable polarization rotators may be operated in tandem with a polarization element disposed in between the polarization rotators, i.e. with one rotator upstream and one rotator downstream of the polarization element. The rotators operate in counter-phase, or in opposition to one another. In other words, the rotators are operated such that when one rotator rotates or switches the polarization, the other rotator does not, and vice versa. The two rotators offset the each other's performance dependence of throughput on wavelength and angle of incidence, resulting in the switching performance, i.e. refocusing, redirection, etc., that substantially does not change the spectral or angular composition of the light beam.

In accordance with the present disclosure, there is provided a switchable optical subassembly comprising a first polarization rotator for switching a polarization state of an impinging light beam between first and second orthogonal polarization states, a polarization element downstream of the first polarization rotator for at least one of polarization-dependent redirecting or polarization-dependent refocusing of the light beam, and a second polarization rotator downstream of the polarization element for switching a polarization state of the light beam between the first and second polarization states in opposition to the first polarization rotator, such that when the first polarization rotator is in a driven state, the second polarization rotator is in an undriven state and vice versa. As a result, a shift of an optical characteristic of the switchable optical subassembly caused by the switching is lessened. The optical characteristic may include e.g. a dependence of a Stokes parameter on at least one of an angle of incidence or a wavelength of the light beam. In embodiments where the first polarization rotator has a first shift of an optical characteristic upon switching the first polarization rotator from the undriven state to the driven state and the second polarization rotator has a second shift of an optical characteristic upon switching the second polarization rotator from the undriven state to the driven state, the second shift may be equal to the first shift to within 10%.

In some embodiments, the switchable optical subassembly may further include a polarizer downstream of the second polarization rotator for blocking light in one of the first or second polarization states and propagating light in the other one of the first or second polarization states. In such embodiments, the switchable optical subassembly may be absent a polarization element between the second polarization rotator and the polarizer, such that in operation, no polarization-dependent redirecting or refocusing of the light beam occurs between the second polarization rotator and the polarizer.

In some embodiments, each one of the first and second polarization rotators may include a switchable half-wave plate. Optical performance of the first and second polarization rotators may be more achromatic in the driven state than in the undriven state. The polarization element may include a Pancharatnam-Berry phase (PBP) element such as a PBP lens, for example.

The switchable optical subassembly may further include a controller operably coupled to the first and second polarization rotators for driving the first and second polarization rotators in opposition to each other, such that when the first polarization rotator is in the driven state, the second polarization rotator is in the undriven state, and vice versa.

In accordance with the present disclosure, there is provided a switchable optical assembly comprising a plurality of the switchable optical subassemblies of this disclosure. The switchable optical subassemblies may be optically coupled in series, forming a stack configuration. Magnitudes of the at least one of polarization-dependent redirecting or polarization-dependent refocusing of the light beam provided by the polarization elements of different switchable optical subassemblies of the switchable optical assembly may be in a binary relationship to one another. In embodiments where the first polarization rotator has a first shift of an optical characteristic upon switching the first polarization rotator from the undriven state to the driven state and the second polarization rotator has a second shift of an optical characteristic upon switching the second polarization rotator from the undriven state to the driven state, the second shift may be equal to the first shift to within 10%.

In some embodiments, each switchable optical subassembly of the switchable optical assembly further comprises a polarizer downstream of the corresponding second polarization rotator for blocking light in one of the first or second polarization states and propagating light in the other of the first or second polarization states. The polarization element of at least one switchable optical subassembly of the switchable optical assembly may include a PBP lens. Optical powers of different PBP lenses may be in a binary relationship to one another.

A controller may be operably coupled to the first and second polarization rotators of each switchable optical subassembly of the switchable optical assembly. The controller may be configured to receive a set optical power value, and provide an optical power of the switchable optical assembly closest to the set optical power value by switching individual switchable optical subassemblies in accordance with their optical powers.

In accordance with the present disclosure, there is further provided a display device comprising a light engine for providing image light carrying an image to be displayed, and a switchable optical assembly of this disclosure disposed downstream of the light engine for receiving the image light. The switchable optical assembly may include a first switchable optical subassembly comprising a first polarization rotator for switching a polarization state of the image light between first and second orthogonal polarization states; a first polarization element downstream of the first polarization rotator for at least one of polarization-dependent redirecting or polarization-dependent refocusing of the image light; and a second polarization rotator downstream of the first polarization element for switching a polarization state of the image light between the first and second polarization states in opposition to the first polarization rotator, such that when the first polarization rotator is in a driven state, the second polarization rotator is in an undriven state and vice versa, whereby a shift of an optical characteristic of the first switchable optical subassembly caused by the switching is lessened.

The switchable optical assembly may further include a second switchable optical subassembly optically coupled to the first switchable optical subassembly. The second switchable optical subassembly may include a third polarization rotator for switching a polarization state of the image light between the first and second polarization states; a second polarization element downstream of the third polarization rotator for at least one of polarization-dependent redirecting or polarization-dependent refocusing of the image light; and a fourth polarization rotator downstream of the second polarization element for switching a polarization state of the image light between the first and second polarization states in opposition to the first polarization rotator, such that when the third polarization rotator is in a driven state, the fourth polarization rotator is in an undriven state and vice versa, whereby a shift of an optical characteristic of the second switchable optical subassembly caused by the switching is lessened. The first and/or second polarization element may include a lens having an optical power dependent on a polarization state of the propagating light. In some embodiments, the display device further comprises a controller operably coupled to the first and second polarization rotators for driving the first and second polarization rotators in opposition to each other, such that when the first polarization rotator is in the driven state, the second polarization rotator is in the undriven state, and vice versa.

Figure 1B:
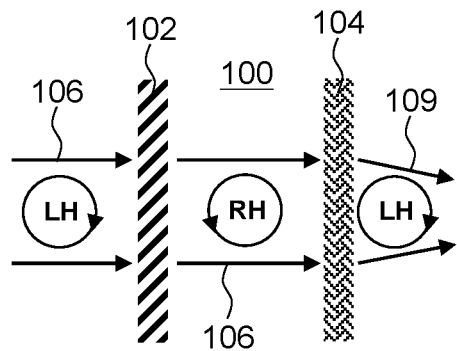
FIG. 1B is a schematic cross-sectional view of the varifocal lens of FIG. 1A, where the switchable polarization rotator is in a second state that changes the polarization of impinging light to an orthogonal polarization.

Referring now to FIGS. 1A and 1B, a varifocal lens 100 includes a polarization rotator 102 coupled to a polarization-selective lens 104. The polarization rotator 102 is switchable between a first state shown in FIG. 1A and a second state shown in FIG. 1B. In this embodiment, the polarization-selective lens 104 is a Pancharatnam-Berry phase (PBP) lens.

In the first state shown in FIG. 1A, the polarization rotator 102 does not modify a polarization state of an impinging light beam 106, which is in this example left-hand (LH) circularly polarized. The LH circularly polarized light beam 106 impinges onto the polarization-selective lens 104 which, for this polarization, provides a diverging output light beam 108 while changing the polarization of the light beam from LH to RH, as illustrated.

In the second state shown in FIG. 1B, the polarization rotator 102 changes the polarization of the impinging light beam 106 from LH circular polarized to a right-hand (RH) circularly polarized. The RH circularly polarized light beam 106 impinges onto the polarization-selective lens 104, which, for this polarization, provides a converging output light beam 109 while changing the polarization of the light beam from RH back to LH.

Figure 2A:
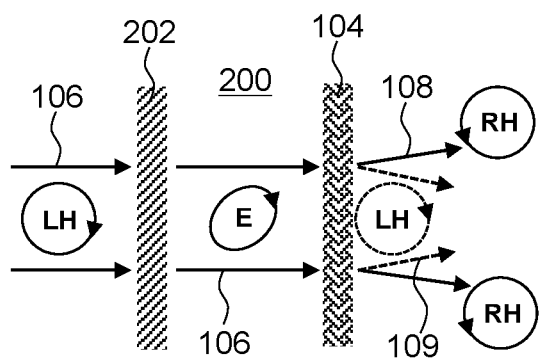
FIG. 2A is a schematic view of a varifocal lens including a twisted nematic (TN) liquid crystal (LC) switchable polarization rotator coupled to a polarization-selective lens, illustrating a residual converging light beam formation due to imperfect polarization transformation by the TN LC polarization rotator in a driven state.
Figure 2B:
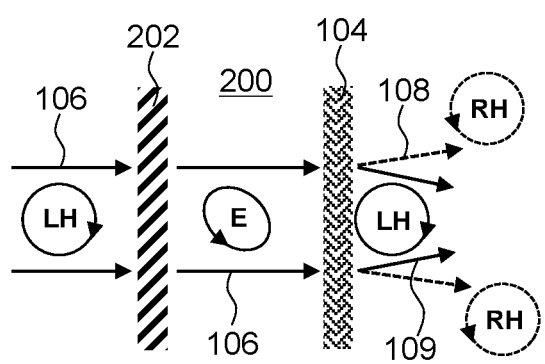
FIG. 2B is a schematic view of the varifocal lens of FIG. 2A illustrating a residual diverging light beam formation due to imperfect polarization transformation by the TN LC polarization rotator in an undriven state.

Turning to FIGS. 2A and 2B, a varifocal lens 200 includes a twisted nematic (TN) liquid crystal (LC) polarization rotator 202 coupled to the polarization-selective lens 104. The TN LC polarization rotator 202 is switchable between a driven state shown in FIG. 2A and an undriven state shown in FIG. 2B.

In the driven state (FIG. 2A), the polarization rotator 102 mostly does not modify a polarization state of the impinging LH circular light beam 106. However, due to imperfection of the polarization transformation by the TN LC polarization rotator 202, the LH circularly polarized light beam 106 becomes slightly elliptically polarized (as denoted with "E"), while retaining the LH chirality. The LH elliptically polarized light beam 106 impinges onto the polarization-selective lens 104, which, for this polarization, provides mostly the diverging output light beam 108 (solid lines) while changing the polarization of the light beam from LH to RH, but also provides the LH circular polarized converging light beam 109 (dashed lines) at a much smaller optical power level. This is undesirable, as for the varifocal lens application, the small portion of the converging light beam 109 may cause a ghost image to appear.

In the undriven state (FIG. 2B), the TN LC polarization rotator 202 changes the polarization state of the impinging light beam from LH circularly polarized to a right-hand (RH) elliptically polarized, again due to imperfection of the TN LC polarization rotator 202. The RH elliptically polarized light beam 106 impinges onto the polarization-selective lens 104 which, for this polarization, provides mostly the converging output light beam 109 (solid lines) while changing the polarization of the light beam from RH back to LH circular, while providing a small fraction of the diverging light beam 108 (dashed lines) at the RH circular polarization. This, too, may cause a ghost image to appear.

Figure 3A:
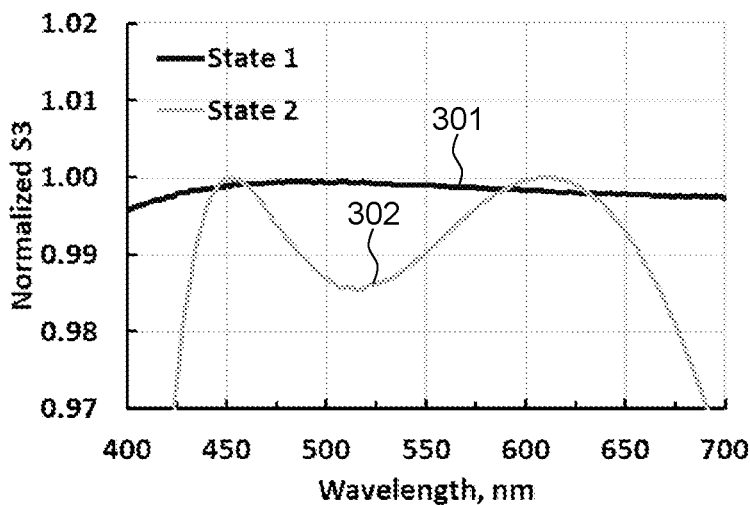
FIG. 3A is a wavelength dependence of an absolute value of a normalized S3 Stokes parameter of light propagated through the TN LC polarization rotator of FIGS. 2A and 2B in the driven and undriven states.

In addition to ghost image formation, the varifocal lens 200 of FIGS. 2A and 2B may exhibit a variation of spectral and angular performance characteristics upon switching of the TN LC polarization rotator 202. Referring, for instance, to FIG. 3A, an absolute value of a normalized S3 Stokes parameter of the light beam 106 propagated through the TN LC polarization rotator 202 is plotted against wavelength for the driven (301; "State 1") and the undriven (302; "State 2") states. For left-handed and right-handed circularly polarized light, the S3 values have different sign. In a sign convention adopted herein, S3=−1 for LH and S3=+1 for RH circularly polarized light. A perfect circular polarization of the light beam 106 prior to impinging onto the TN LC polarization rotator 202 input is assumed. One can see that the driven state of the TN LC polarization rotator 202 is much more achromatic than the undriven state. In the driven state, the retardation of the TN LC polarization rotator 202 is close to zero, while in the undriven state, the retardation is close to half a wavelength at 520 nm. At shorter wavelengths corresponding to blue parts of the visible spectrum, the retardation is greater than half wavelength (in wavelength units of the impinging light beam 106), and at longer wavelengths corresponding to red part of the spectrum, the retardation is less than half wavelength, which causes the absolute value of the normalized S3 Stokes parameter to strongly vary with wavelength.

Figure 3B:
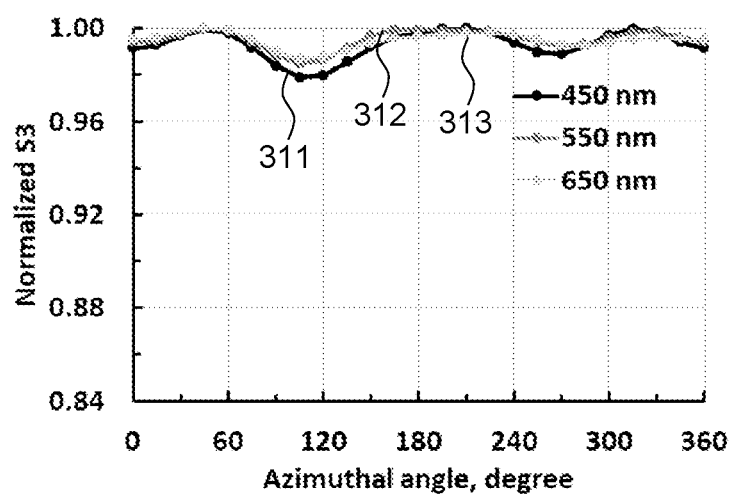
FIG. 3B is an azimuthal angle dependence of the absolute value of the normalized S3 Stokes parameter of light propagated through the TN LC polarization rotator in the driven state, for wavelengths of 450 nm, 550 nm, and 650 nm.
Figure 3C:
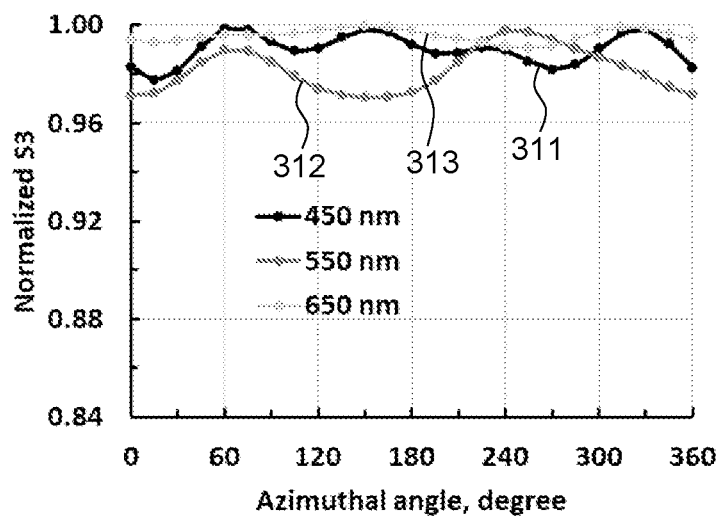
FIG. 3C is an azimuthal angle dependence of the absolute value of the normalized S3 Stokes parameter of light propagated through the TN LC polarization rotator in the undriven state, for wavelengths of 450 nm, 550 nm, and 650 nm.

Referring now to FIG. 3B, the normalized S3 Stokes parameter of the transmitted light is plotted vs. azimuthal angle of incidence for the driven state. It is seen that, while there is a variation of the magnitude of the absolute value of the normalized S3 Stokes parameter with wavelength, the variations for a blue wavelength 311, green wavelength 312, and red wavelength 313 are similar. In FIG. 3C, the same parameter is plotted vs. wavelength for the undriven state, showing a more significant variation of the spectral function with the wavelength. This may cause a color shift of an image viewed through the varifocal lens 200 upon switching the TN LC polarization rotator 202 of the varifocal lens 200.

In accordance with this disclosure, the color shift and the image ghosting may be lessened, compensated for, or offset, by providing an additional polarization rotator downstream of the polarization element, the additional polarization rotator operating in a counter-phase with the upstream polarization rotator. The additional polarization rotator may bring the polarization state of the light beam to a same state, allowing a cleanup polarizer to be placed downstream of the additional polarization rotator. Since the light beam propagates through a pair of polarization rotators in opposite states, both the color shift and image ghosting may be lessened as a result.

Figure 4A:
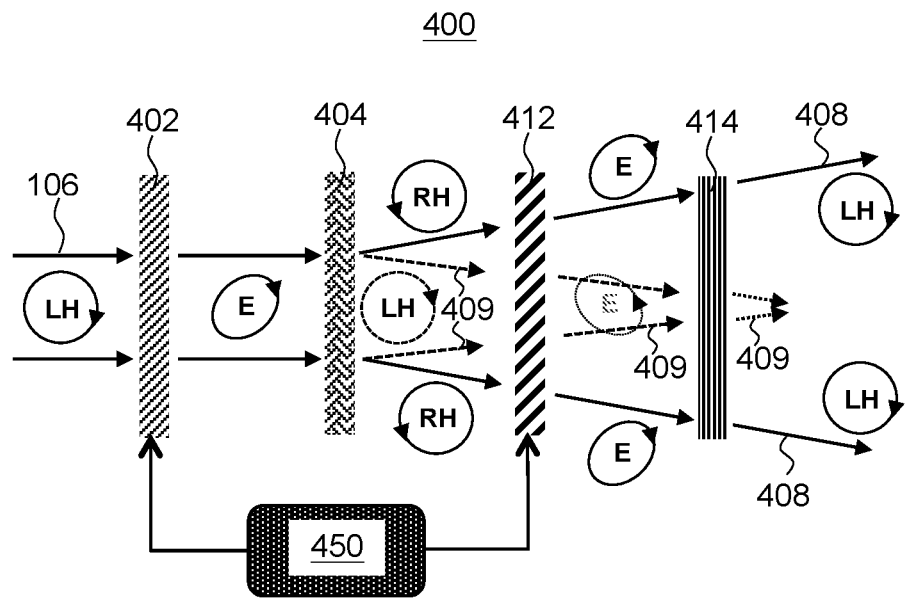
FIG. 4A is a schematic cross-sectional view of a switchable optical subassembly including a pair of switchable polarization rotators driven in opposition to each other, where the first rotator is in the first state and the second rotator is in the second state.
Figure 4B:
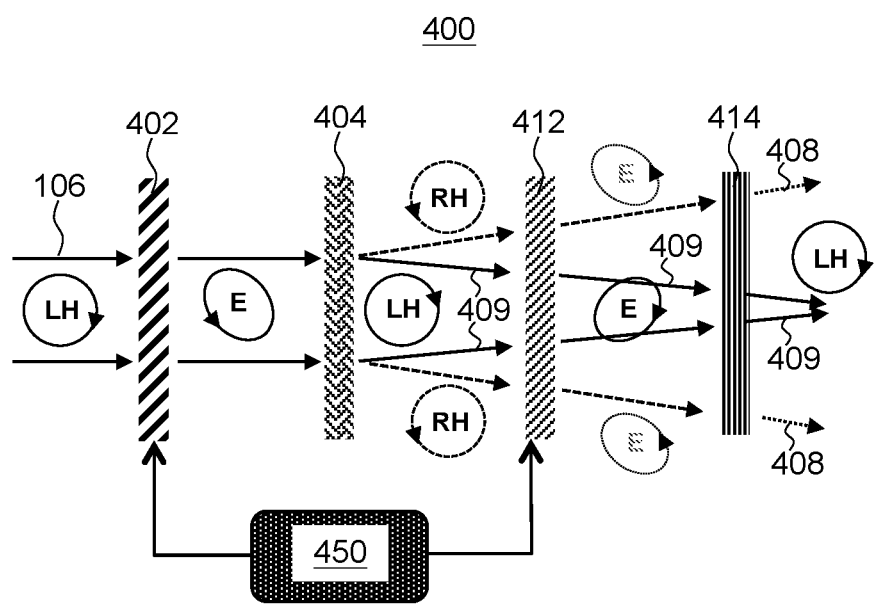
FIG. 4B is a schematic cross-sectional view of the switchable optical subassembly of FIG. 4A, where the first rotator is in the second state and the second rotator is in the first state.

Referring for a non-limiting illustrative example to FIGS. 4A and 4B, a switchable optical subassembly 400 includes a first polarization rotator 402 for switching a polarization state of the impinging light beam 106 between first and second orthogonal polarization states, in this example between LH and RH circular polarizations. A polarization element 404 is disposed downstream of the first polarization rotator 402. The polarization element 404 may exert a polarization-dependent action on the light beam 106 such as, for example, polarization-dependent redirecting and/or polarization-dependent refocusing of the light beam 106. A second polarization rotator 412 is disposed downstream of the polarization element 404 for switching a polarization state of the light beam 106 between the first and second polarization states. A controller 450 may be operably coupled to the first 402 and second 412 polarization rotators for driving the first 402 and second 412 polarization rotators in opposition to each other, such that when the first polarization rotator 402 is in the driven state, the second polarization rotator 412 is in the undriven state, and vice versa.

FIG. 4A shows the switchable optical subassembly 400 in a first state. The impinging light beam 106 propagates through the first polarization rotator 402, which is in the driven state substantially preserving the input LH polarization, although introducing a slight residual ellipticity indicated with the "E" sign. The polarization element 404, in this embodiment a PBP lens, provides a polarization-dependent focusing of the light beam 106. At the input LH polarization, the PBP lens defocuses the light beam 106 while flipping its polarization state to RH, providing a diverging light beam 408. The diverging light beam 408 propagates through the second polarization rotator 412, which is in the undriven state, converting the RH circular polarization into a slightly elliptical LH polarization. An optional cleanup polarizer 414 (a circular polarizer) propagates through the LH circularly polarized diverging light beam 408 while blocking light at the orthogonal polarization, i.e. RH circularly polarized light in this case.

The ghost image light path of FIG. 4A is as follows. The slight elliptical polarization of the light beam 106 propagated through the first polarization rotator 402 due to imperfection of the latter results in the formation of a converging light beam 409 downstream of the polarization element 404. The converging light beam 409 is LH circularly polarized. Upon propagating through the second polarization rotator 412, the converging light beam 409 becomes RH slightly elliptically polarized. Has it been perfectly circularly polarized, the converging light beam 409 would have been blocked by the cleanup circular polarizer 414. However, due to the residual LH polarization caused by the slight ellipticity of the converging light beam 409, a very small portion of the converging light beam 409 may still propagate through the cleanup polarizer 414, as illustrated.

FIG. 4B shows the switchable optical subassembly 400 in the second state, which operates similarly to the first state depicted in FIG. 4A, only the polarization transformation of the converging 409 and diverging 408 light beams is reversed, and the converging light beam 409 propagates through the cleanup polarizer 414. It is to be noted that in the embodiment shown in FIGS. 4A and 4B, no polarization element is provided between the second polarization rotator 412 and the polarizer 414, such that in operation, no polarization-dependent redirecting or refocusing of the light beam occurs between the second polarization rotator 412 and the cleanup polarizer 414.

In both the first state depicted in FIG. 4A and the second state depicted in FIG. 4B, the light beam 106 will propagate through one polarization rotator in the undriven state and one polarization rotator in the driven state. Due to this, the total angle and wavelength dependent throughput of both polarization rotators on a light ray at a same azimuthal angle and wavelength tends to be independent on the switching state of the switchable optical subassembly 400, whereby a shift of an optical characteristic of the switchable optical assembly 400 caused by the switching is lessened.

It is to be further noted that the compensation of the undesired shift of the optical characteristic will occur not only for TN LC polarization rotators or other types of switchable half-wave plates, but for any other types of polarization rotators. When the first polarization rotator 402 has a first shift of an optical characteristic, e.g. the Stokes parameter shift, upon switching the first polarization rotator 402 from the undriven state to the driven state and the second polarization rotator 412 has a second shift of a corresponding optical characteristic upon switching the second polarization rotator 412 from the undriven state to the driven state, the color shift of one will be offset by the color shift of the other when the second parameter shift is equal to the first parameter shift to e.g. within 10%, preferably to within 3%, and more preferably to within 1%.

Figure 5:
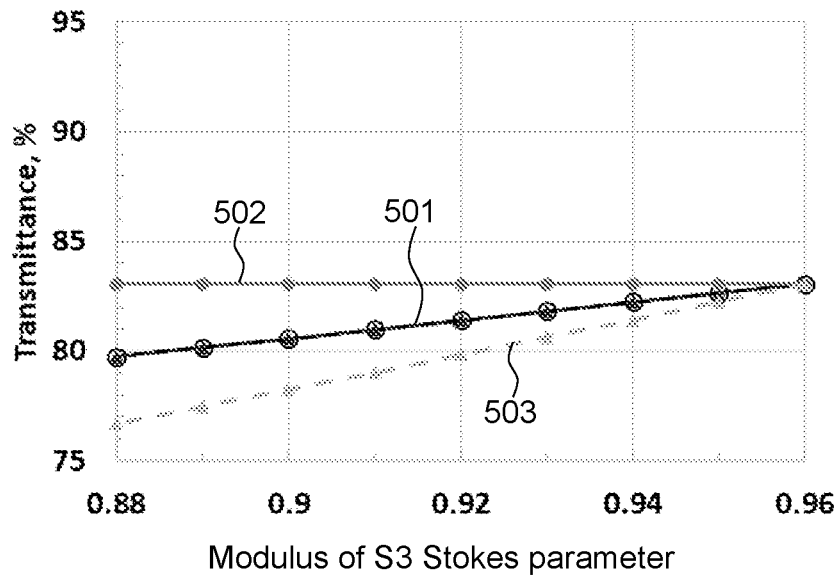
FIG. 5 is a dependence of transmittance vs. the S3 Stokes parameter for a configuration when the polarization rotators are driven in opposition to one another and in a same manner, i.e. in phase with one another, for comparison.

FIG. 5 illustrates a dependence of the transmittance of the switchable optical subassembly 400 of FIGS. 4A, 4B on the modulus of S3 Stokes parameter. For the counter-phase driven first 402 and second 412 polarization rotators, both states have substantially a same dependence 501 (FIG. 5), indicating that the transmittance, or the optical throughput, does not depend on the switching state, i.e. whether the switchable optical subassembly 400 focuses or defocuses the impinging light beam 106. For the case when the first 402 and second 412 polarization rotators are driven in-phase, i.e. both in the driven state or both in the undriven state, the dependence of the transmittance on the S3 Stokes parameter is very different for the all-driven 502 or all-undriven 503 states, indicating a strong color shift upon switching.

Figure 6:
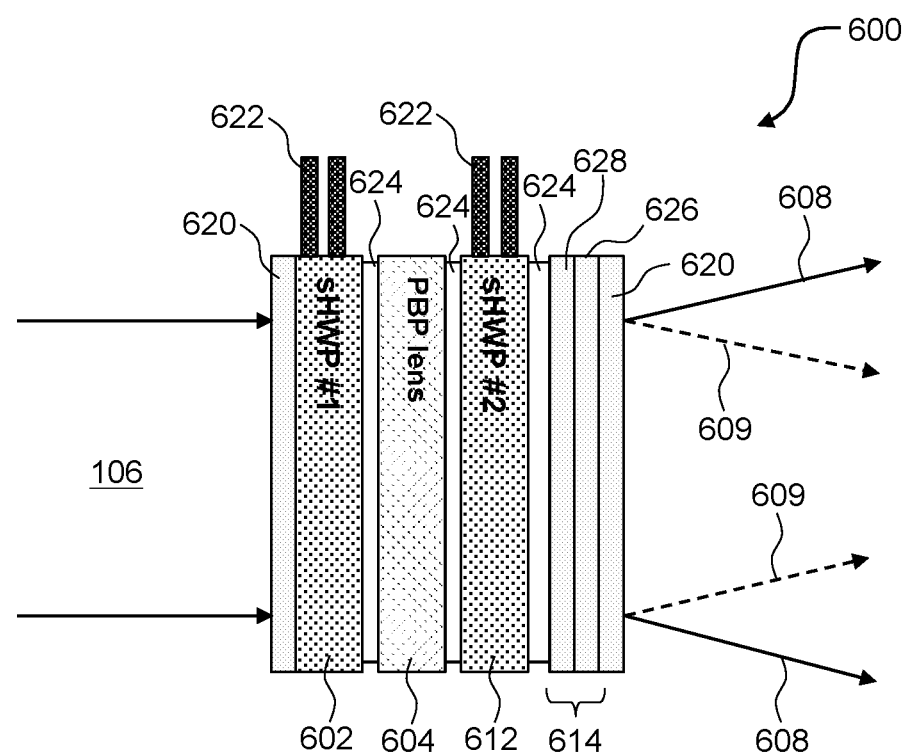
FIG. 6 is a cross-sectional view of an example implementation of the switchable optical subassembly of FIGS. 4A and 4B.

Turning now to FIG. 6 with further reference to FIGS. 4A and 4B, a varifocal lens 600 is an example implementation and embodiment of the switchable optical subassembly 400 of FIGS. 4A and 4B. The varifocal lens 600 of FIG. 6 includes a stack of a first switchable half-wave plate (sHWP) 602, a PBP LC lens 604, a second sHWP 612, and a circular polarizer 614, coupled together by optically transparent pressure-sensitive adhesive 624. Antireflection (AR) coatings 620 may be provided on outer surfaces of the stack. The circular polarizer 614 may include a stack of a quarter-wave plate (QWP) 628 and a linear polarizer 626 downstream of the QWP 628. The first 602 and second 612 sHWPs are each energized via a pair of flexible electrodes 622. Similarly to the switchable optical subassembly 400, the varifocal lens 600 has two operational states which, for the specific case of the varifocal lens 600, have different focusing powers. In the first state, the varifocal lens 600 defocuses the impinging light beam 106, producing a diverging output beam 608 shown with solid lines. In the second state, the varifocal lens 600 focuses the impinging light beam 106, producing a converging output beam 609 shown with dashed lines. The varifocal lens 600 may be combined with a fixed optical power lens to vary the optical power between two positive (converging) or between two negative (diverging) optical power values, as required.

In some sHWP types such as sHWP based on twisted nematic (TN) or mixed twisted nematic (MTN) LC cells with positive LC materials, the state that rotates the polarization corresponds to a small or no driving or modulating signal applied to the sHWP. Such state is called "undriven state" or "non-modulated state", even though a small driving signal may be applied to the sHWP, e.g. to fine-tune the polarization rotation performance in the "undriven state". The state that does not state the polarization corresponds to a high driving signal applied to the sHWP. Such a state is called herein "driven state" or "modulated state". In other sHWP types, the performance may be the opposite, i.e. the state that rotates the polarization may be the driven state, and the state that dose not may be the undriven state.

Embodiments of polarization elements usable in switchable optical (sub)assemblies of this disclosure will now be considered. Referring to FIG. 7A, an Pancharatnam-Berry phase (PBP) LC lens 700 includes LC molecules 702 in an LC layer 704. The LC molecules 702 are disposed in XY plane at a varying in-plane orientation depending on the distance r from the lens center. The orientation angle $\phi(r)$ of the LC molecules 702 in the liquid crystal layer 704 of the PBP LC lens 700 is given by $$\phi(r) = \frac{\pi r^2}{2 f_o \lambda_o} \quad (1a)$$

where $f_o$ is a desired focal length and $\lambda_o$ is wavelength. The optical phase delay in the PBP LC lens 700 is due to Pancharatnam-Berry phase, or geometrical phase effect. An optical retardation R of the liquid crystal layer 704 having a thickness/is defined as $R=t\Delta n$, where $\Delta n$ is the optical birefringence of the LC layer 704. At the optical retardation R of the LC layer 704 of $\lambda_o/2$, i.e. half wavelength, the accumulated phase delay P(r) due to the PBP effect can be expressed rather simply as $P(r)=2\phi(r)$, or, by taking into account Eq. (1a) above, $$P(r) = \frac{\pi r^2}{f_o \lambda_o} \quad (1b)$$

It is the quadratic dependence of the PBP P(r) on the radial coordinate r that results in the focusing, or defocusing, function of the LC PBP lens 100. This is different from a conventional LC spatial phase modulator (SLM), which utilizes changes in the tilt angle to provide a spatial phase distribution, and often has a discontinuity at a boundary of $2\pi$ modulo. A PBP device, such as the PBP lens 700, has the azimuthal angle $\phi$ continuously and smoothly varying across the surface of the LC layer 704 as illustrated in FIG. 7B. Accordingly, the mapping of the azimuthal angle to PBP, i.e. $P(r)=2\phi(r)$ when $R=\lambda_o/2$, allows for a more drastic phase change without introducing discontinuities at a boundary of $2\pi$ modulo typically present in a conventional LC SLM.

The optical performance of the PBP LC lens 700 is illustrated in FIG. 8. In FIG. 8, the LC molecules of the PBP LC lens 700 are disposed predominantly in-plane, i.e. in XY plane. In the embodiment shown, the optical retardation of the PBP LC lens 700 is a half wavelength; thus, the PBP LC lens 700 acts as a half-wave waveplate with spatially varying fast axis, changing the polarization of incoming light from (LH) circular polarized to RH circular polarized, and vice versa. A sign, or direction, of the phase profile of a PBP device depends on polarization. By way of example, when an incoming optical beam 800 is LH circularly polarized, the phase delay at the lens center decreases toward the periphery of the PBP LC lens 700, such that the PBP LC lens 700 focuses the beam 800, which becomes RH circularly polarized. The focused RH circularly polarized beam 800 is shown with solid lines. When an incoming optical beam 800 is RH circularly polarized, the phase delay at the lens center increases toward the periphery of the PBP LC lens 700, such that the PBP LC lens 700 defocuses the beam 800, which becomes LH circularly polarized. The defocused LH circularly polarized beam 800 is shown with dashed lines.

Turning to FIGS. 9A and 9B, a PBP LC grating 900 includes LC molecules 902 in an LC layer 904. The LC molecules 902 are disposed in XY plane at a varying in-plane orientation depending on the X coordinate. The orientation angle $\phi(x)$ of the LC molecules 902 in the PBP LC grating 900 is given by $$\phi(x) = \pi x/T = \pi x \sin \theta / \lambda_o \quad (2)$$

where $\theta$ is a diffraction angle given by $$\theta = \sin^{-1}(\lambda_o/T) \quad (3)$$

where T is pitch of the PBP LC grating 900. The azimuthal angle $\phi$ varies continuously across the surface of the LC layer 904 as illustrated in FIG. 9B, with the constant pitch T. By comparison, the pitch T of the azimuthal angle Ø variation in FIG. 7B is not constant, i.e. $T_1$ is generally not equal to $T_2$. The optical phase delay P in the PBP LC grating 900 of FIG. 9A is also due to the PBP effect, i.e. $P(r)=2\phi(x)$ when $R=\lambda_o/2$.

Optical performance of the PBP LC grating 900 is illustrated in FIG. 10. The LC molecules 902 are disposed predominantly in-plane, i.e. in XY plane. When an incoming light beam 1000 is LH circularly polarized, the PBP LC grating 900 redirects the beam 1000 upwards, which becomes RH circularly polarized. The RCP deflected beam 1000 is shown with solid lines. When the impinging light beam 1000 is RH circularly polarized, the PBP LC grating 900 redirects the beam 1000 downwards, which becomes LH circularly polarized. The LH circularly polarized deflected beam 1000 is shown with dashed lines.

Figure 11:
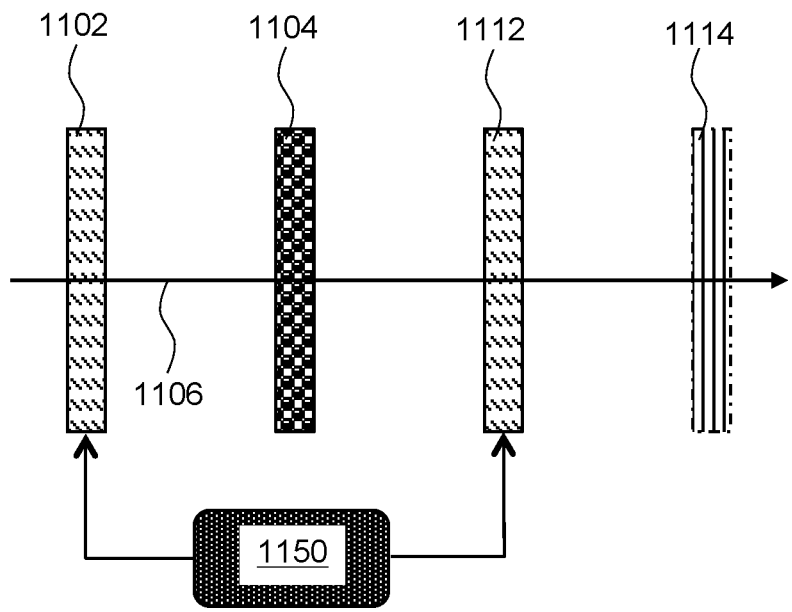
FIG. 11 is a generalized view of a switchable optical subassembly of this disclosure.

FIG. 11 is an exploded view of a switchable optical subassembly 1100 of this disclosure, which is a generalization of the switchable optical subassembly 400 of FIGS. 4A and 4B. The switchable optical subassembly 1100 generally includes a first polarization rotator 1102 for switching a polarization state of an impinging light beam 1106 between first and second orthogonal polarization states, a polarization element 1104 downstream of the first polarization rotator 1102 for at least one of redirecting or refocusing the light beam 1106, and a second polarization rotator 1112 downstream of the polarization element 1104 for switching a polarization state of the light beam 1106 between the first and second polarization states. A controller 1150 may be operably coupled to the first 1102 and second 1112 polarization rotators. The controller 1150 causes the second polarization rotator 1112 to operate in opposition or counterphase to the first switchable polarization rotator: when the first polarization rotator 1102 is in a driven state, the second polarization rotator 1112 s in an undriven state, and vice versa. In such a driving configuration, a shift of an optical characteristic of the switchable optical assembly 1100 caused by the switching is lessened. The change imparted by the polarization element 1104 onto the light beam 1106 depends on the polarization state of the impinging light beam 1106.

A cleanup polarizer 1114 may be provided downstream of the second polarization rotator for blocking light in an unwanted polarization state, e.g. the polarization state of the light carrying a ghost image, and propagating light in the desired polarization state, as explained above with reference to FIGS. 4A and 4B. In some embodiments, no polarization elements exhibiting polarization-selective redirecting/refocusing of the propagating light beam are present in the portion of the light path between the second polarization rotator 1112 and the cleanup polarizer 1114.

The first 1102 and second 1112 polarization rotators may operate in counter-phase, that is, when one polarization rotator switches the polarization state of impinging light, the other one does not, and vice versa, enabling mutual compensation of differences in spectral throughput and angular performance in the different states of the polarization rotators 1102, 1112. For example, when the impinging light beam 1106 upstream of the first polarization rotator 1102 is in the first polarization state, the first polarization rotator 1102 may switch the polarization state to the second polarization state. The polarization element 1104 refocuses and/or redirects the light beam 1106, optionally changing its polarization state back to the first polarization state. The second polarization rotator 1112 does not switch the polarization state of the light beam 1106, and the cleanup polarizer 1114 propagates through the light beam 1106 in the first polarization state. When the first polarization rotator 1102 does not switch the polarization state to the second polarization state, the polarization element 1104 refocuses and/or redirects the light beam 1106 in accordance with its polarization state, changing its polarization state back to the second polarization state (as PBP optical elements do, for example). The second polarization rotator 1112, operating in the counter-phase with the first polarization rotator 1102, switches the polarization state of the light beam 1106 to the first polarization state, and the cleanup polarizer 1114 propagates through the light beam 1106 in the first polarization state.

The propagation state of the cleanup polarizer 1114 may correspond to the polarization state of the impinging light; in the example of FIG. 11, the input light beam 1106 is LH circularly polarized, and the cleanup polarizer 1114 propagates the LH circularly polarized light through.

The switchable optical subassembly 400 of FIGS. 4A, 4B, the varifocal lens 600 of FIG. 6, and the switchable optical subassembly 1100 of FIG. 11 are only non-limiting examples of polarization-switchable structures considered herein. The polarization elements are not limited to PBP elements. Other suitable types of polarization elements may be used. Furthermore, the sHWP and PBP elements may be cascaded to have more than one polarization element. For example, a stack of alternating sHWP and PBP elements may be provided for switching between more than two focusing states of the varifocal lens, or more than one redirecting states of a variable beam redirector.

Figure 12:
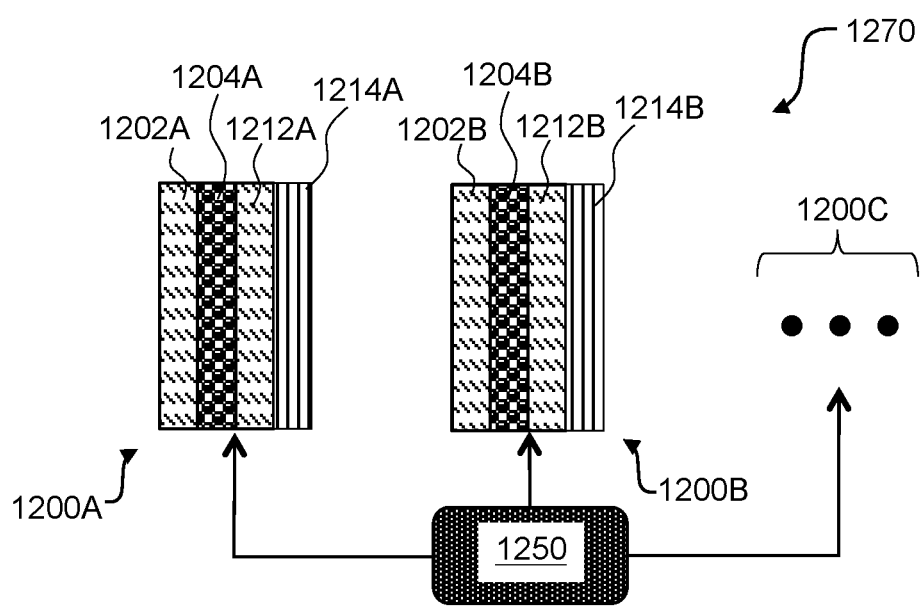
FIG. 12 is a generalized view of a switchable optical assembly of this disclosure; including a succession or stack of the optical subassemblies of FIG. 11.

Referring to FIG. 12 for a non-limiting illustrative example of the latter point, a switchable optical assembly 1270 includes a first switchable optical subassembly 1200A and a second switchable optical subassembly 1200B. The first 1200A and second 1200B switchable optical subassemblies may include e.g. the switchable optical subassembly 400 of FIGS. 4A, 4B, the varifocal lens 600 of FIG. 6, and/or the switchable optical subassembly 1100 of FIG. 11. The switchable optical subassemblies 1200A, 1200B are optically coupled in series. More than two switchable optical subassemblies may be provided e.g. optical subassemblies 1200C, etc. The optical subassemblies 1200A, 1200B, 1200C may form an optical stack.

In the embodiment illustrated in FIG. 12, the first switchable optical subassembly 1200A includes a first polarization rotator 1202A for switching a polarization state of an impinging light beam between first and second orthogonal polarization states, a first polarization element 1204A downstream of the first polarization rotator 1202A for at least one of polarization-dependent redirecting or polarization-dependent refocusing of the light beam, and a second polarization rotator 1212A downstream of the first polarization element 1204A for switching a polarization state of the light beam between the first and second polarization states. The second polarization rotator 1212A operates in opposition to the first switchable polarization rotator 1202A, such that when the first polarization rotator 1202A is in a driven state, the second polarization rotator 1212A is in an undriven state and vice versa, for lessening a switching-induced shift of an optical characteristic of the first switchable optical subassembly, as discussed above. A first cleanup polarizer 1214A may be provided downstream of the second polarization rotator 1212A.

Similarly, the second switchable optical subassembly 1200B may include a third polarization rotator 1202B for switching a polarization state of the light beam between the first and second orthogonal polarization states, a second polarization element 1204B downstream of the third polarization rotator 1202B for at least one of polarization-dependent redirecting or polarization-dependent refocusing of the light beam, and a fourth polarization rotator 1212B downstream of the second polarization element 1204B for switching a polarization state of the light beam between the first and second polarization states in opposition to the first switchable polarization rotator, such that when the third polarization rotator is in a driven state, the fourth polarization rotator is in an undriven state and vice versa, for lessening a switching-induced shift of an optical characteristic of the first switchable optical subassembly. A second cleanup polarizer 1214B may be provided downstream of the second polarization rotator 1212B, to cleans up the output and reduce ghosting. In some embodiments, the magnitudes of the polarization-dependent redirecting and/or refocusing provided by the polarization elements of different switchable optical subassemblies 1200A, 1200B may be in a binary relationship to one another, to provide the maximum possible range of switching or tuning per number of individual subassemblies. For example, in a tunable lens application, PBP polarization lens elements may have optical power (i.e. focusing/defocusing power e.g. in Diopters) in a binary (i.e. x1, x2, x4, x8 . . . ) relationship to one another.

A controller 1250 may be operably coupled to the first and second polarization rotators of each switchable optical subassembly 1200A, 1200B of the switchable optical assembly 1270. The controller 1250 may be configured to receive a set optical parameter value (i.e. focusing/defocusing power for varifocal lens applications), and provide an optical power of the switchable optical assembly 1270 closest to the set optical parameter value by switching individual switchable optical subassemblies 1200A, 1200B in accordance with their optical switchable optical parameter magnitudes.

Figure 13:
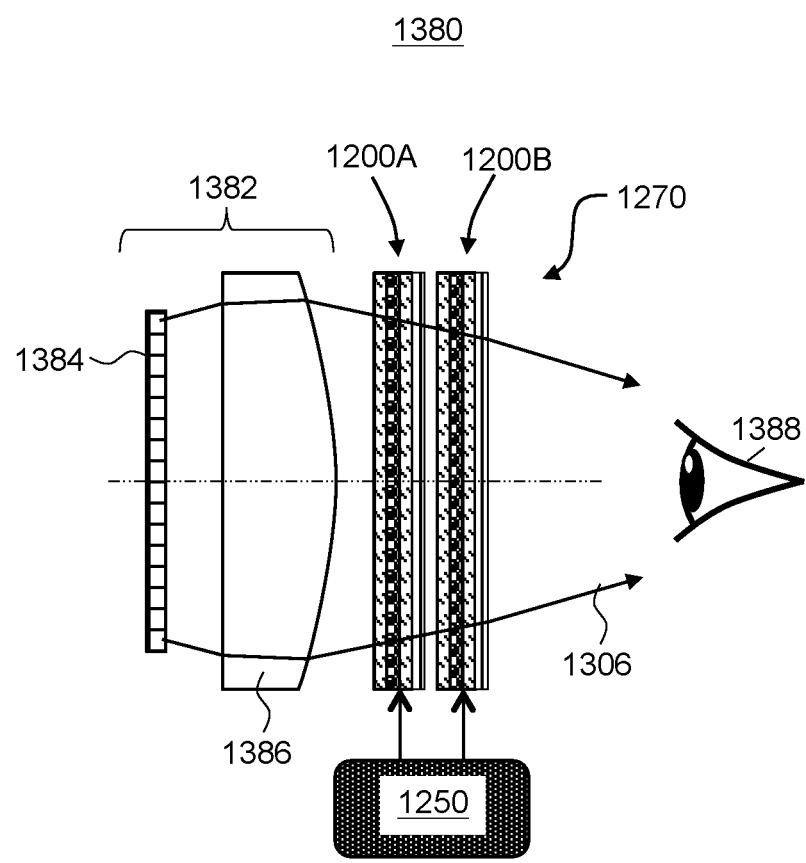
FIG. 13 is a schematic side view of a visual display of this disclosure including the switchable optical assembly of FIG. 12.

Turning to FIG. 13 with further reference to FIG. 12, a display device 1380 includes a light engine 1382 for providing image light 1306 carrying an image to be displayed, and the switchable optical assembly 1270 of FIG. 12 coupled to the light engine 1382. The switchable optical assembly 1270 is disposed downstream of the light engine 1382. The latter may include a display panel 1384 coupled to a collimator 1386, as illustrated. Other light engine configurations, e.g. ones based on image projectors and beam scanners, may be used. The switchable optical assembly 1270 may provide a controllable refocusing and/or redirection of the image light 1306. The controller 1250 may be operably coupled to the polarization rotators of each optical subassembly 1200A, 1200B and configured for driving the first and second polarization rotators in opposition to each other, such that when the first polarization rotator is in the driven state, the second polarization rotator is in the undriven state, and vice versa. As explained above, the opposition or counter-phase driving of the polarization rotators allows one to lessen color and/or brightness shift of the image observed by a user's eye 1388 when operating the switchable optical assembly 1270.

Figure 14:
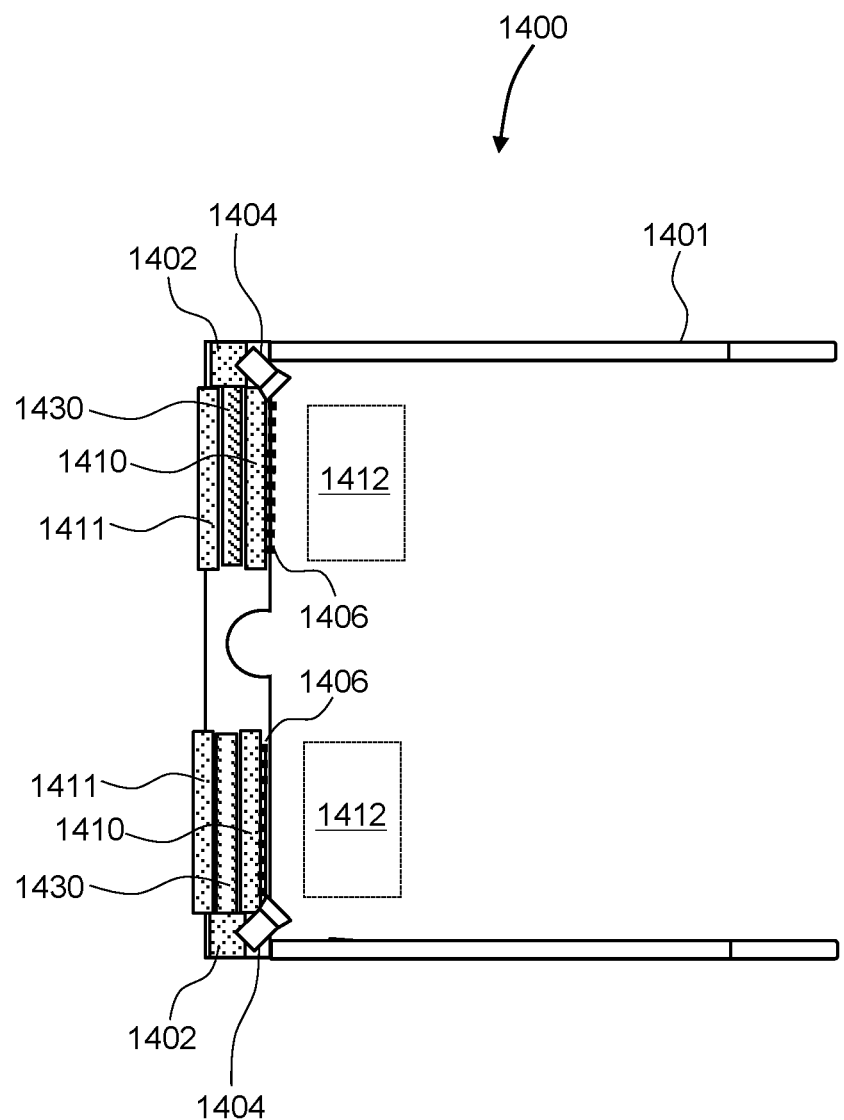
FIG. 14 is a view of an augmented reality (AR) display of this disclosure having a form factor of a pair of eyeglasses.

Referring to FIG. 14, an augmented reality (AR) near-eye display (NED) 1400 may use switchable optical (sub)assemblies disclosed herein for switch and/or expanding field of view, providing variable focusing, etc. The AR NED 1400 includes a frame 1401 supporting, for each eye: a light engine or image projector 1402 for providing image light carrying an image to be displayed; a pupil-replicating lightguide 1430 for guiding the image light inside and outcoupling portions of the image light towards an eyebox 1412; a varifocal lens 1410 including any of the switchable optical (sub)assemblies disclosed herein; a compensating varifocal lens 1411 including any of the switchable optical (sub)assemblies disclosed herein, for compensating for (de)focusing of external light by the varifocal lens 1410; an eye-tracking camera 1404; and a plurality of eyebox illuminators 1406 shown as black dots. The eyebox illuminators 1406 may be supported by varifocal lens 1410 for illuminating the eyebox 1412.

The purpose of the eye-tracking cameras 1404 is to determine position and/or orientation of both eyes of the user to enable steering the output image light to the locations of the user's eyes as disclosed herein. The illuminators 1406 illuminate the eyes at the corresponding eyeboxes 1412, to enable the eye-tracking cameras 1404 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1406, the light illuminating the eyeboxes 1412 may be made invisible to the user. For example, infrared light may be used to illuminate the eyeboxes 1412. Other eye-tracking configurations may be employed.

Figure 15:
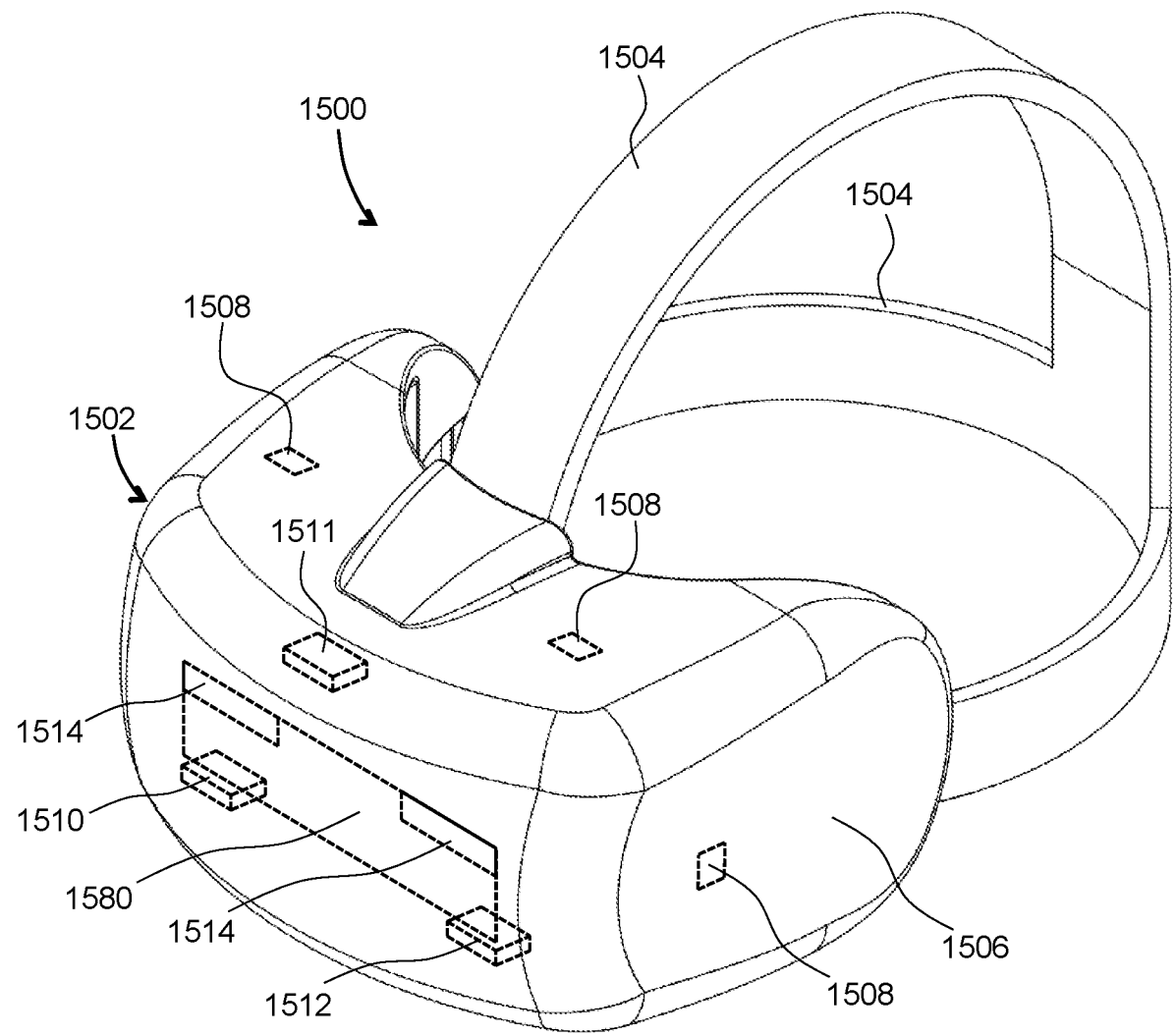
FIG. 15 is a three-dimensional view of a head-mounted display (HMD) of this disclosure.

Turning to FIG. 15, an HMD 1500 is an example of an AR/VR wearable display system which encloses the user's face, for a greater degree of immersion into the AR/VR environment. The HMD 1500 may generate the entirely virtual 3D imagery. The HMD 1500 may include a front body 1502 and a band 1504 that can be secured around the user's head. The front body 1502 is configured for placement in front of eyes of a user in a reliable and comfortable manner. A display system 1580 may be disposed in the front body 1502 for presenting AR/VR imagery to the user. The display system 1580 may include any of the switchable optical (sub)assemblies disclosed herein. Sides 1506 of the front body 1502 may be opaque or transparent.

In some embodiments, the front body 1502 includes locators 1508 and an inertial measurement unit (IMU) 1510 for tracking acceleration of the HMD 1500, and position sensors 1512 for tracking position of the HMD 1500. The IMU 1510 is an electronic device that generates data indicating a position of the HMD 1500 based on measurement signals received from one or more of position sensors 1512, which generate one or more measurement signals in response to motion of the HMD 1500. Examples of position sensors 1512 include: one or more accelerometers, one or more gyroscopes, one or more magnetometers, another suitable type of sensor that detects motion, a type of sensor used for error correction of the IMU 1510, or some combination thereof. The position sensors 1512 may be located external to the IMU 1510, internal to the IMU 1510, or some combination thereof.

The locators 1508 are traced by an external imaging device of a virtual reality system, such that the virtual reality system can track the location and orientation of the entire HMD 1500. Information generated by the IMU 1510 and the position sensors 1512 may be compared with the position and orientation obtained by tracking the locators 1508, for improved tracking accuracy of position and orientation of the HMD 1500. Accurate position and orientation is important for presenting appropriate virtual scenery to the user as the latter moves and turns in 3D space.

The HMD 1500 may further include a depth camera assembly (DCA) 1511, which captures data describing depth information of a local area surrounding some or all of the HMD 1500. The depth information may be compared with the information from the IMU 1510, for better accuracy of determination of position and orientation of the HMD 1500 in 3D space.

The HMD 1500 may further include an eye tracking system 1514 for determining orientation and position of user's eyes in real time. The obtained position and orientation of the eyes also allows the HMD 1500 to determine the gaze direction of the user and to adjust the image generated by the display system 1580 accordingly. The determined gaze direction and vergence angle may be used to adjust the display system 1580 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1502.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A switchable optical subassembly comprising:
   a first polarization rotator for switching a polarization state of impinging light between first and second polarization states that are orthogonal to one another;
   a polarization element downstream of the first polarization rotator for at least one of polarization-dependent redirecting or polarization-dependent refocusing of the light, wherein the polarization element is configured to output a portion of the light as converging light beams polarized in a third polarization state and an additional portion of the light as diverging light beams polarized in a fourth polarization state that is orthogonal to the third polarization state; and
   a second polarization rotator downstream of the polarization element for switching a polarization state of the light between the first and second polarization states in opposition to the first polarization rotator such that, when the first polarization rotator is in a driven state, the second polarization rotator is in an undriven state and vice versa, whereby a shift of an optical characteristic of the switchable optical subassembly caused by the switching is lessened.

2. The switchable optical subassembly of claim 1, wherein:
   the first polarization rotator has a first shift of an optical characteristic upon switching the first polarization rotator from the undriven state to the driven state;
   the second polarization rotator has a second shift of an optical characteristic upon switching the second polarization rotator from the undriven state to the driven state; and
   the second shift is equal to the first shift to within 10%.

3. The switchable optical subassembly of claim 1, further comprising a polarizer downstream of the second polarization rotator for blocking light in one of the first or second polarization states and propagating light in the other one of the first or second polarization states.

4. The switchable optical subassembly of claim 3, absent a polarization element between the second polarization rotator and the polarizer, such that in operation, no polarization-dependent redirecting or refocusing of the light occurs between the second polarization rotator and the polarizer.

5. The switchable optical subassembly of claim 1, wherein each one of the first and second polarization rotators comprises a switchable half-wave plate.

6. The switchable optical subassembly of claim 1, wherein optical performance of the first and second polarization rotators is more achromatic in the driven state than in the undriven state.

7. The switchable optical subassembly of claim 1, wherein the polarization element comprises a Pancharatnam-Berry phase (PBP) element.

8. The switchable optical subassembly of claim 7, wherein the PBP element comprises a PBP lens.

9. The switchable optical subassembly of claim 1, wherein the optical characteristic comprises a dependence of a Stokes parameter on at least one of an angle of incidence or a wavelength of the light.

10. The switchable optical subassembly of claim 1, further comprising a controller operably coupled to the first and second polarization rotators for driving the first and second polarization rotators in opposition to each other, such that when the first polarization rotator is in the driven state, the second polarization rotator is in the undriven state, and vice versa.

11. A switchable optical assembly comprising a plurality of the switchable optical subassemblies of claim 1 optically coupled in series.

12. The switchable optical assembly of claim 11, wherein magnitudes of the at least one of polarization-dependent redirecting or polarization-dependent refocusing of the light provided by the polarization elements of different switchable optical subassemblies of the switchable optical assembly are in a binary relationship to one another.

13. The switchable optical assembly of claim 11, wherein, for each switchable optical subassembly of the switchable optical assembly:
   the first polarization rotator has a first shift of an optical characteristic upon switching the first polarization rotator from the undriven state to the driven state;
   the second polarization rotator has a second shift of an optical characteristic upon switching the second polarization rotator from the undriven state to the driven state; and
   the second shift is equal to the first shift to within 10%.

14. The switchable optical assembly of claim 11, wherein each switchable optical subassembly of the switchable optical assembly further comprises a polarizer downstream of the corresponding second polarization rotator for blocking light in one of the first or second polarization states and propagating light in the other of the first or second polarization states.

15. The switchable optical assembly of claim 11, further comprising a controller operably coupled to the first and second polarization rotators of each switchable optical subassembly of the switchable optical assembly and configured to:
- receive a set optical power value; and
- provide an optical power of the switchable optical assembly closest to the set optical power value by switching individual switchable optical subassemblies in accordance with their optical powers.

16. The switchable optical subassembly of claim 1, wherein:
- the first and second polarization states comprise:
  - a left-hand slightly elliptically polarized state; and
  - a right-hand slightly elliptically polarized state; and
- the third and fourth polarization states comprise:
  - a left-hand circularly polarized state; and
  - a right-hand circularly polarized state.

17. A display device comprising:
- a light engine for providing image light carrying an image to be displayed; and
- a switchable optical assembly disposed downstream of the light engine for receiving the image light and comprising a first switchable optical subassembly comprising:
  - a first polarization rotator for switching a polarization state of the image light between first and second polarization states that are orthogonal to one another;
  - a first polarization element downstream of the first polarization rotator for at least one of polarization-dependent redirecting or polarization-dependent refocusing of the image light, wherein the first polarization element is configured to output a portion of the light as converging light beams polarized in a third polarization state and an additional portion of the light as diverging light beams polarized in a fourth polarization state that is orthogonal to the third polarization state; and
  - a second polarization rotator downstream of the first polarization element for switching a polarization state of the image light between the first and second polarization states in opposition to the first polarization rotator, such that when the first polarization rotator is in a driven state, the second polarization rotator is in an undriven state and vice versa, whereby a shift of an optical characteristic of the first switchable optical subassembly caused by the switching is lessened.

18. The display device of claim 17, wherein the switchable optical assembly further comprises a second switchable optical subassembly optically coupled to the first switchable optical subassembly, the second switchable optical subassembly comprising:
- a third polarization rotator for switching a polarization state of the image light between the first and second polarization states;
- a second polarization element downstream of the third polarization rotator for at least one of polarization-dependent redirecting or polarization-dependent refocusing of the image light; and
- a fourth polarization rotator downstream of the second polarization element for switching a polarization state of the image light between the first and second polarization states in opposition to the first polarization rotator, such that when the third polarization rotator is in a driven state, the fourth polarization rotator is in an undriven state and vice versa, whereby a shift of an optical characteristic of the second switchable optical subassembly caused by the switching is lessened.

19. The display device of claim 17, wherein the first polarization element comprises a lens having an optical power dependent on a polarization state of the image light.

20. The display device of claim 17, further comprising a controller operably coupled to the first and second polarization rotators for driving the first and second polarization rotators in opposition to each other, such that when the first polarization rotator is in the driven state, the second polarization rotator is in the undriven state, and vice versa.

* * * * *